United States Patent
Borgen (10) Patent No.: US 10,205,364 B2
(45) Date of Patent: Feb. 12, 2019

(54) TORSION COMPENSATOR

(71) Applicant: TECHNI HOLDING AS, Borre (NO)

(72) Inventor: Harald Borgen, Horten (NO)

(73) Assignee: TECHNI HOLDING AS, Borre (NO)

( * ) Notice: Subject to any disclaimer, the term of this patent is extended or adjusted under 35 U.S.C. 154(b) by 513 days.

(21) Appl. No.: 14/389,278

(22) PCT Filed: Mar. 27, 2013

(86) PCT No.: PCT/IB2013/052425
§ 371 (c)(1),
(2) Date: Sep. 29, 2014

(87) PCT Pub. No.: WO2013/144855
PCT Pub. Date: Oct. 3, 2013

(65) Prior Publication Data
US 2015/0171704 A1 Jun. 18, 2015

(30) Foreign Application Priority Data
Mar. 30, 2012 (NO) .................................. 20120394

(51) Int. Cl.
*H02K 7/00* (2006.01)
*H02K 1/30* (2006.01)
(Continued)

(52) U.S. Cl.
CPC .................. *H02K 7/12* (2013.01); *H02K 1/30* (2013.01); *H02K 5/132* (2013.01); *H02K 7/003* (2013.01);
(Continued)

(58) Field of Classification Search
CPC ............ H02K 1/27; H02K 1/28; H02K 7/003; H02K 7/00; E21B 4/04; E21B 4/006;
(Continued)

(56) References Cited

U.S. PATENT DOCUMENTS 1,490,219 A * 4/1924 Labberton et al. ....... F16C 3/02
310/265
2,346,432 A * 4/1944 Heintz .................. F16F 15/129
144/35.2
(Continued)

FOREIGN PATENT DOCUMENTS

DE 102009004871 A1 7/2010
DE 102009048715 A1 4/2011
(Continued)

OTHER PUBLICATIONS

English Machine Translation, Yaesawa, JP 2007-209163, Aug. 2007.*
English translation of WO2010/124606, Hao et al. (Year: 2010).*
English translation of WO2010/124595, Hao et al. (Year: 2010).*

*Primary Examiner* — Burton S Mullins
(74) *Attorney, Agent, or Firm* — Birch, Stewart, Kolasch & Birch, LLP (57) ABSTRACT

The main function of the invention is the rectification of angular errors due to torsion in long and slim axles for electric motors of which a rotor and stator are divided into two or more sub motors, and wherein rotors are coupled to a common axle and wherein two or more stator elements are supplied with equal electrical phases from a power supply cable. The invention is a system and a coupling between rotor elements and an axle extending through the system, the purpose being to dynamically compensate for angular errors due to torsion in the axle between two or more rotor elements in which the torsion angle would influence negatively the electrical efficiency of the rotor elements. The object of the invention is the angular positioning of rotor elements so that the poles are electrically synchronous, thereby avoiding reduction of the electrical efficiency due to torsion in the axle.

8 Claims, 3 Drawing Sheets

(51) Int. Cl.
*E21B 17/07* (2006.01)
*E21B 17/04* (2006.01)
*H02K 7/12* (2006.01)
*H02K 16/00* (2006.01)
*H02K 5/132* (2006.01)
*H02K 7/04* (2006.01)
*F16D 3/12* (2006.01)
*E21B 4/04* (2006.01)

(52) U.S. Cl.
CPC .............. *H02K 7/04* (2013.01); *H02K 16/00* (2013.01); *E21B 4/04* (2013.01); *E21B 17/07* (2013.01); *F16D 3/12* (2013.01); *H02K 2213/09* (2013.01)

(58) Field of Classification Search
CPC ........ E21B 17/073; E21B 17/076; E21B 4/02; F16D 3/12; F16D 3/80
USPC .................. 310/51, 114, 87; 464/86, 97, 78; 175/95, 101
See application file for complete search history.

(56) References Cited

U.S. PATENT DOCUMENTS

| | | | | | |
|---|---|---|---|---|---|
| 2,590,169 | A * | 3/1952 | Fritz | ............ | H02K 7/003 464/180 |
| 3,673,813 | A * | 7/1972 | Wright | ............ | F16D 3/72 464/180 |
| 4,143,722 | A * | 3/1979 | Driver | ............ | E21B 4/02 175/104 |
| 4,227,584 | A * | 10/1980 | Driver | ............ | E21B 4/02 175/104 |
| 4,471,248 | A * | 9/1984 | Smetana | ............ | F16F 15/124 310/216.124 |
| 5,135,060 | A * | 8/1992 | Ide | ............ | E21B 4/02 175/107 |
| 5,923,111 | A * | 7/1999 | Eno | ............ | E21B 43/128 310/153 |
| 6,225,719 | B1 * | 5/2001 | Hallundbæk | ............ | H02K 5/173 310/112 |
| 6,388,353 | B1 * | 5/2002 | Liu | ............ | F04B 13/00 310/114 |
| 6,808,455 | B1 * | 10/2004 | Solorenko | ............ | F16D 3/12 464/20 |
| 6,997,271 | B2 * | 2/2006 | Nichols | ............ | E21B 17/00 175/24 |
| 7,378,769 | B2 * | 5/2008 | Head | ............ | E21B 43/128 166/66.4 |
| 7,608,962 | B2 | 10/2009 | Franke | | |
| 7,642,683 | B2 * | 1/2010 | Powers | ............ | H02K 21/029 310/114 |
| 7,911,110 | B2 | 3/2011 | Choi et al. | | |
| 8,299,661 | B2 * | 10/2012 | Jeung | ............ | H02K 1/2733 310/156.08 |
| 8,323,115 | B2 * | 12/2012 | Hocking | ............ | E21B 17/07 464/20 |
| 8,672,641 | B2 * | 3/2014 | Yuratich | ............ | E21B 43/128 417/44.1 |
| 2001/0023785 | A1 | 9/2001 | Geiger et al. | | |
| 2003/0168925 | A1 | 9/2003 | Bernreuther et al. | | |
| 2006/0243489 | A1 * | 11/2006 | Wassell | ............ | E21B 17/073 175/57 |
| 2008/0061647 | A1 * | 3/2008 | Schmitt | ............ | E21B 4/04 310/112 |
| 2011/0120772 | A1 * | 5/2011 | McLoughlin | ............ | E21B 17/05 175/56 |
| 2011/0241500 | A1 | 10/2011 | Lamke et al. | | |
| 2012/0228028 | A1 * | 9/2012 | Turner | ............ | E21B 17/07 175/56 |

FOREIGN PATENT DOCUMENTS

| | | | |
|---|---|---|---|
| EP | 2218939 A1 | 8/2010 | |
| EP | 2355993 A1 | 8/2011 | |
| JP | 2007209163 A * | 8/2007 | .............. H02K 1/27 |
| WO | WO 00/17987 A2 | 3/2000 | |
| WO | WO 2004/114498 A2 | 12/2004 | |
| WO | WO 2010/066545 A1 | 6/2010 | |
| WO | WO-2010124595 A1 * | 11/2010 | ............. H02K 5/132 |
| WO | WO-2010124606 A1 * | 11/2010 | ............. G01D 11/24 |

* cited by examiner

TORSION COMPENSATOR

The present invention concerns a system for compensation of torsion in a rotor axle for long electric motors where a rotor is divided into several sub rotors.

The present invention concerns a system for adjusting an angle error due to torsion in long and slim axles for electric motors where two or more rotors are connected to a common axle and where two or more stators are provided with equal electrical phases from cable. The system is a coupling between the electrical rotor and axle running through them, where the purpose is to provide a flexible coupling that compensates for angular errors due to torsion in an axle between two or more sub rotors with respect to electrical stators, wherein a torsion angle would influence the electrical efficiency of the rotor in a negative way. The invention works as a variable coupling where the transmission of the torque from each sub electrical rotor to axle is approximately independent of relative angle change between each single sub rotor and axle, and mutually between the single sub rotors. The purpose of the invention is to position sub rotors electrically synchronous with the corresponding electrical stators so that the electrical efficiency is not reduced due to torsion in the axle.

The invention consists in principle of an inner sleeve that is coupled to an axle and an outer sleeve that is coupled to rotor. Between the inner sleeve and the outer sleeve it is arranged a system that can transmit a variable torque that gives a variable angular change in that the two sleeves rotates relatively to each other. Where the single components in the coupling cannot be viewed as separate sleeves, these are viewed as part of a rotor construction and support of the relative rotation. The relative angle change as a function of torque can be arranged in three different mode of operations:

a) Angular change may be arranged as a flexible unit, where the angle change is a function of the torque the rotor is performing towards the coupling, where the characteristic angle change for each of the single sub rotors is equal to the accumulated angle change calculated from a position (length) to the end of the opposite side of the payload on the axle. This type of solution is known as a torsion spring which exactly corresponds to the torsion in the axle with respect of position (length), where the part rotor situated closest to the payload (drive end) has largest relative rotation compared to axle, and the sub rotor furthest away from payload is only coupled directly to axle. All other sub rotors would then rotate the corresponding sub rotor on the non-drive side in that the stiffness in axle is stepwise corrected in each single coupling between sub rotor and axle.

b) Angular change may be arranged as a continuous angle change per time unit as a function of the torque the rotor is performing on the coupling. This type of coupling is better known as a skid coupling with continuously relative rotation velocity.

c) Angular change may be arranged as a flexible unit where angular change is a function of the torque the rotor is performing towards the coupling, where the change of angle in the coupling itself is relatively large compared to torsion of axle. This type of solution is known as a torsion spring that causes a large angular change compared to the torque load, but with a relatively similar yield in transmitted torque for each of the sub rotors.

Each of the operation modes have the same property in that torsion due to torque is dynamically corrected compared to the torque that is transmitted between each sub rotor and axle. In addition to dynamical compensation of the torsion, it is important that possible self-oscillations between rotor and axle, and/or between rotors, are reduced to a minimum with a device that dampens vibrations based on relative rotation velocity between stator and axle. Compared to operation mode (b) this function is implicitly part of the operation mode in that it is a continuously relative rotation velocity between rotor and axle. For the other operation modes (a) and (b) this dynamical dampening must be arranged in the construction so that the desired properties for reducing, or elimination, of oscillations are achieved.

The background for the invention is the need for long, slim motors for downhole pumps in the oil industry. Traditionally there have only been applied asynchronous induction motors for these downhole pumps. Such a motor typically consists of a number of multiple sub rotors and stators, where each sub rotor is coupled to a common axle that runs through the entire length of the motor. Due to space requirements said axle is only dimensioned for the mechanical strength needed for the torque it should transmit. The total length of such a motor can be everything from 1 to 30 meters. During large outputs and long axle the torsion on the axle may be more than one turn (360 degrees) during start-up and significant (0-180 degrees) during operation. For asynchronous induction motors the magnetisation of the rotor is based on continuous skidding, i.e. a relative angular velocity between rotation of magnetic field in stator and velocity of rotor that provides induction of a current in electric conductor of the rotor, which again results in that it is induced a magnetic field acting against the magnetic field of the rotor, thereby creating a force that pulls the rotor around. In this way the rotation of the rotor becomes asynchronous compared to the stator, and it is thus no need for large corrections of torsion in the axle. A synchronous motor for downhole applications must also be constructed with a number of multiple stator and rotors due to the requirements of support, etc. For a synchronous motor based on permanent magnets (PM) it is important that the rotors are synchronous so that the magnetic field is as equal as possible for each rotor compared to the position of the stator. If there are large variations in the electrical synchronization between stator and rotor for the different sub rotors, the efficiency and maximum provided power compared to torque will be reduced. A possible method of solving this is with an electrical control, in which an angular measurement is used on each sub rotor or groups of rotors that measures the absolute position compared to the stator(s). Hence, each sub rotor or groups of rotors may be controlled electrically on individual basis. Such a solution requires that each sub rotor or group of sub rotors are connected to their own supply cable. Due to the desire of high voltages, between 3000 and 6000 V, resulting in large isolation thicknesses and shielding on each supply cable, this would cause a lack of physical space for the many sets of supply cables within the tubing or annulus. The fact that available new oil reservoirs are found at very large depths results in that those new oil wells sets higher demands for transmission of large power and better efficiency for downhole pumps than seen earlier.

An additional method for regulating the magnetic field to a stator is to place control electronics downhole so that the need for several sets of supply cables is eliminated. However, such deep wells will have high temperatures, hence it is not possible to implement this method with the current technology in view of the fact that it will result in a short operation time of the control electronics and that there are no available components that efficiently regulate voltages up to 6000 V.

Due to the above, there is a need and wish of using synchronous motors based on the application of permanent magnets (PM). Motors with permanent magnets have, due to its to their construction, a significantly better efficiency compared to asynchronous motors. The challenge with such long synchronous motors is however that torsion on the axle reduces the efficiency compared to the torque produced by the motor. The device in accordance with the invention is a dynamic mechanical correction of this torsion so that best possible efficiency is also obtained for electric motors with long, slim axles.

The present invention may thus be rendered possible in various ways, wherein a common function of these ways will be to dynamically correct for torsion in an axle so that the electrical efficiency for the number of multiple rotors and stators is maintained.

Known devices, wherein the angle error due to torsion is attempted solved, is chiefly based on static correction of the angle of each rotor, so that the motor at a specific standardized load has a correct correction exactly corresponding to the torsion of the axle.

U.S. Pat. No. 6,388,353 B1 discloses a permanent magnet motor, where each of the rotor elements in the permanent magnet motor is counter-displaced (rotated) with an angle corresponding to a total torsion angle compared to the position at a specific standardized load, and where the rotors are furthermore locked with wedges to the axle.

The German patent application DE 10 2009 048 715 A1 attempts to solve the same by locking rotor segments to the axle using an axial force. Here the rotor segments with permanent magnets are manufactured in the form of discs that may rotate freely relative to each other. A tool is also disclosed that renders easy adjustment of angles possible. The rotor segments are fastened by interconnecting the rotors by an axial pre-tensioning so that they are locking by mutual friction and to the arrangement on each side.

U.S. Pat. No. 7,608,962 B2 is also referred to, wherein two rotor sections are arranged so that they can rotate relatively to each other by use of an active regulating system. The purpose with this solution is an active actuator adjustment of rotor segments so that best possible efficiency, and highest possible torque, is achieved over a wide range of rotational speed. The solution is applied in electrical motors for vehicles in which the electrical efficiency is important in relation to mileage and starting torque.

US 2003/0168925 A1 concerns a permanent magnet rotor for an electric motor, wherein the permanent magnet rotor comprises a plastic support element and a permanent magnet ring. The support element comprises a centrally designed seat for a bearing and a rotor axle designed as a hollow shaft. Furthermore, a drive gear is molded to the end of the rotor axle, while the permanent magnet ring is surrounded by the support element in an opposite end of the drive gear. Further, a magnet yoke ring is arranged between the support element and the permanent magnet ring. To prevent torsion between the support element and the magnet yoke ring and/or the permanent magnet ring, the magnet yoke ring and/or the permanent magnet ring is/are designed with recesses or notches.

U.S. Pat. No. 7,911,110 B2 concerns a motor with two rotors that for example may be used in a washing machine. The motor comprises an outer rotor having a first base, and a first extension extended from a circumference of the first base substantially perpendicular thereto, the first extension having outer magnets mounted on an inside circumferential surface, an inner rotor having a second base mounted on an upper surface of the first base concentric to the first base, and a second extension extended from a circumference of the second base so as to be opposite to the first extension with a predetermined gap toward an inner side of the first extension, the second extension having inner magnets mounted on an outside circumferential surface, and a bushing at a center of the first base and the second base, for transmission of rotation force to a rotating shaft, both from the outer rotor and the inner rotor.

Unlike these published systems and patents the present invention is based on a self regulating mechanical system that rotates each individual part rotor relatively to the twist in an axle within the synchronous permanent magnet motor so that the poles of each sub rotors are always as electrically corrected as possible compared to the optimal electrical efficiency for each individual sub rotor or groups of sub rotors, which stator(s) are coupled to the same electrical phases.

A purpose with the present invention is therefore to provide a system for compensation of torsion in rotor axles within electric motors, wherein one or more disadvantages of the prior art are eliminated or at least reduced.

Another purpose with the present invention is to provide a system for dampening the torsion oscillations within the rotor axle of the electric motor, where a device is an integrated part of torsion compensation. This device is not a presumption for a working invention, but it is a practical arrangement that stabilises possible torsion oscillations.

The above mention purposes are achieved by a system for compensation of torsion in rotor axles within electric motors as specified in the following independent claim, wherein further features of the invention are given in the dependent claims and the description below.

In the present invention terms such as rotor, rotor element, stator and stator element are used to describe the system for compensation of torsion in axle within an electric motor. It should be understood that rotor is identical to rotor element (and vice versa), while stator is identical to stator element (and vice versa).

The present invention concerns a system for compensation of torsion in axle within an electric motor, where the electric motor comprises a number of multiple stator and rotor elements, where permanent magnets are suitably connected to the rotor elements. A device for compensation of torsion in the axle within the electric motor is then arranged for each rotor element. Each of the devices for compensation of torsion in the axle will then compensate for angular error due to torsion in axle between the numbers of rotor elements, whereby the rotor elements are positioned electrically synchronous so that the electrical efficiency is not reduced due to torsion in the axle.

In one embodiment of the device for compensation of torsion within an electric motor in accordance with the invention the device comprises a torsion element arranged between the axle of the electric motor and the rotor of the electric motor. The device comprises a torsion element in form of a sleeve and is suitably attached to an axle and the rotor, for example by a wedge, force fit or similar. The torsion element is over its circumference and length further designed with a number of slits arranged parallel with the longitudinal direction of the torsion element, whereby these slits are used to adapt the stiffness of the torsion element. Induced magnetic forces acting from a stator element towards permanent magnet attached to the rotor elements will create a torque around the centre of the rotor element. The torsion element connected to the axle and the rotor element is then twisted since the torque from the rotor element must run through the torsion element. The torque acting through the torsion element is then rotating the rotor element relatively compared to the through-running axle. The torsion stiffness of each torsion element for the respective stator and rotor elements is however adjusted so that all rotor elements will rotate equally as the rotor element arranged furthest from the driving side.

The torsion stiffness of the torsion elements which are arranged between the rotor elements and axle may cause dynamic torsion resonance (self resonance) between the rotor elements on the axle. These torsion resonances are dampened and limited by a device for compensation of torsion in an axle in accordance with the invention by arrangement of a chamber in one end of a rotor element, wherein this chamber is filled with a fluid, such as oil or similar. In the chamber it is arranged a dynamic piston attached to the torsion element and a stationary piston attached to the rotor element. The dynamic piston is designed with at least one through going opening or hole, of which the at least one hole or opening causes a controlled viscous resistance towards the flow of fluid through the piston when one end of the torsion element rotates relatively to the rotor element. The chamber is limited by the axle, the rotor element and an end lid, so that an enclosed chamber is formed.

In another embodiment of a device for compensation of torsion in an axle in accordance with the present invention the device comprises an external house, in which external house is arranged radially a number of hydraulic pistons. Each of the hydraulically pistons comprise a spring and a one-way valve. In this way the hydraulic pistons are pushed down towards the axle within the electric motor, wherein this axle is designed as a cam shaft. The one-ways valves are further designed to allow a fluid, for example oil, to flow into each hydraulic piston when the hydraulic pistons are moving from its compressed position (when a cam in the cam shaft compresses the hydraulic piston) and towards the cam shaft (when the cam in the cam shaft has passed the hydraulic piston due to torsion), while the one-way valves prevent inflow of fluid when they are in their compressed position. When the cam shaft rotates compared to the external house, the cams pushes the hydraulic pistons radially outwards, where this causes (due to the added torque) a controlled amount of fluid to flow out of each piston. The hydraulic pistons having the check valves and the springs are then controlled by the cams in the cam shaft so that they provide an even resistance against the torque from each and one of the rotor elements of the electric motor. As specified above each rotor elements within the electric motor is then connected to the device A for compensation of torsion in the cam shaft, causing all rotor elements to self adjust so that they run synchronous. The common slim axle then rotates with constant angle velocity compared to all of the rotor elements. The skid velocity relatively to the axle is typically as little as possible in view of practical implementation.

A further embodiment of a device for compensation of torsion in an axle in accordance with the invention comprises the device positioned between an external house (rotor) and the axle, where the transmission of torque is provided by discs or vanes, of which every second disc or vane is attached to the house and axle, and which would influence each other by a relative rotational velocity with a torque set up by viscous forces from an intermediate medium (oil) situated between the discs or vanes. This device may be considered as a hydrodynamic realization of an asynchronous motor and is better known as a skid coupling that partly is used in cars with automatic transmission or in differential force power transmissions.

Pursuant to a further embodiment of a device for compensation of torsion in an axle in accordance with the invention the device comprises an external house that through spring means is attached to an interior sleeve, where the spring means acts with a certain torsion stiffness by relative rotation between the external house and the interior sleeve. The interior sleeve is further connected to the axle through locking means, for example a lock mandrel or similar, so that it cannot move in the longitudinal direction of the axle. A torsion stiffness between the external house and the interior sleeve is achieved by designing the interior sleeve with a spiral formed surface (thread), the spiral formed surface co-operating with a correspondingly designed spiral formed surface in another interior sleeve. The interior sleeves are then suitably connected to an axle within the electric motor, wherein the other interior sleeve is arranged within the sleeve. The other sleeve is further co-operating with a piston arranged within a volume limited by the external house and the axle. The piston is balanced by a counter force from a spiral formed spring, wherein this spring is arranged within the volume limited by the external house and the axle. This volume, limited by the external house, the axle, the spiral formed springs and the pistons, is then filled with a fluid, for example oil, and this creates an enclosed chamber that together with an opening or slit designed between the outer house and the lock mandrel function as a viscous dampener. The specific torsion stiffness is then achieved by combining gradient of the spiral formed surface constituting part of the design of the interior sleeves and the axial stiffness of the spiral springs. An axial displacement of pistons results in that a specific volume of enclosed oil changes proportionally with axial movement. The oil may then flow in or out of the enclosed chamber via the opening. Based on the area of the opening the dynamic response may be adapted so that the self oscillations within the axle and/or between the rotor elements are avoided or reduced to a minimum.

Pursuant to yet an embodiment of a device for compensation of torsion in an axle in accordance with the invention the device comprises an axial cam shaft exerting an approximately proportional change in angular velocity per torque between an outer sleeve and an inner sleeve. The axial cam shaft is arranged axially in the outer sleeve. In the inner sleeve it is further arranged a number of hydraulic pistons. When the outer and inner sleeves are axially interlocked the hydraulic pistons are extending over the cams in the axial cam shaft. The inner sleeve is rigidly connected to the through running axle within the electric motor. The axial cam shaft is then locked to the outer sleeve that again is connected to the magnetic rotor. This results in that the generated torque within the electric motor is transmitted to the axle due to a relative rotational velocity between the outer sleeve and the inner sleeve. The hydraulic pistons also comprise springs so that the hydraulic pistons are pushed down towards the cam shaft. In a similar way as described in connection with the second embodiment of the invention the hydraulic pistons are also in this embodiment designed with their own check valve, which check valves only provide oil flow into the piston chamber of the hydraulic pistons. The total resistance towards the torque compared to the relative velocity between the outer sleeve and the inner sleeve is then dependent of the attack angle on the axial cam shaft and the controlled leakage from each of the hydraulic pistons. The skid velocity relatively to the axle is also here typically as little as possible in view of practical implementation.

Other advantages and characteristics of the present invention will be apparent from the following detailed description, the accompanying drawings and the following claims, where

In the present invention designations such as rotor, rotor element, stator, stator element will be used to describe the system for compensation of torsion in an axle within an electric motor. It should be understood that rotor 1 is identical to rotor element 26 (and vice versa), while stator is identical to stator element 27 (and vice versa).

An electric motor comprises a number of multiple stator and rotor elements, wherein each rotor element is suitably connected to a common axle that extends throughout the length of the electric motor.

Figure 1:
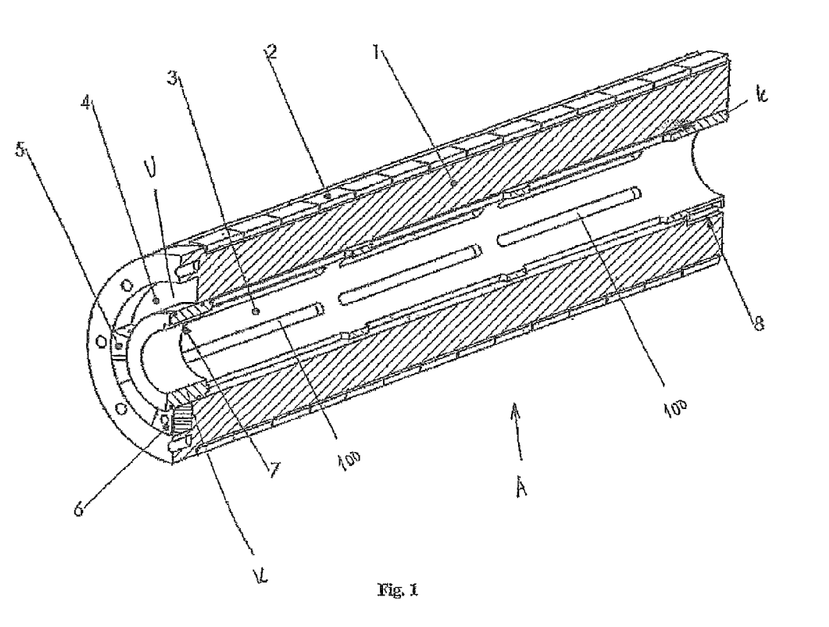
FIG. 1 shows an embodiment of a device within a system for compensation of torsion in a rotor axle inside an electric motor in accordance with the present invention, illustrated as a cross section.

In FIG. 1 a first embodiment of a device A within a system is shown for compensation of torsion in an axle extending throughout the electric motor, wherein the device is shown cooperative with one of the rotors 1 of the electric motor, whereby each rotor 1 then will be designed with a corresponding device A. The device A is arranged between the axle of the electric motor (not shown) and the rotor 1 of the electric motor. The device A is designed as a torsion element 3 in the form of a sleeve extending over the entire or part of the axle length. By use of a wedge K the torsion element 3 is connected to the axle (not shown) at point 7 and the rotor 1 at point 8. The ends of the torsion element 3 are designed as slots (not shown) or similar. However, it should be understood that also other types of connections may be applied to achieve the desired coupling between the torsion element 3 and the axle and the rotor 1. A skilled person will understand what is required to be done, hence this will not be described in further details.

Figure 5:
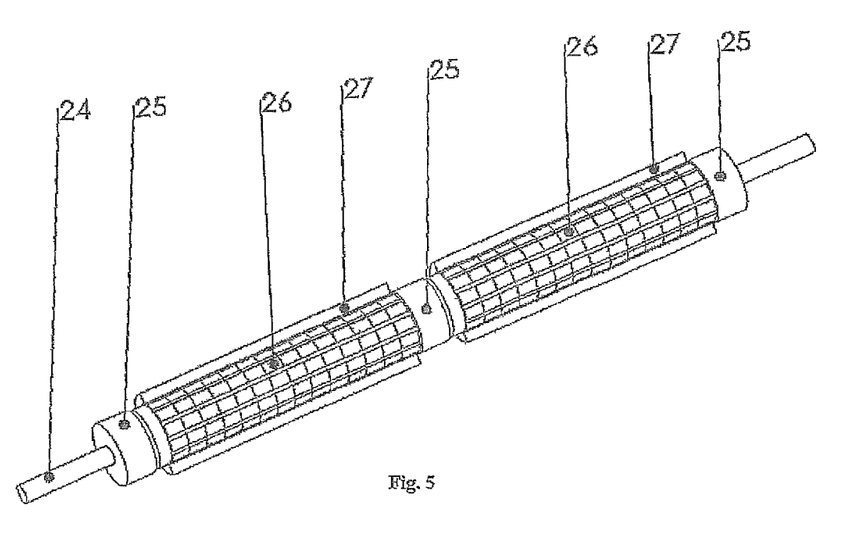
FIG. 5 shows a typical arrangement of the device within a system in accordance with the present invention.

The rotor 1 of the electric motor is indicated as a rotor element 26 in FIG. 5.

Further, the sleeve in the torsion element 3 is designed with a number of slits 100 over its circumference and length, which slits 100 extend along the longitudinal length of the sleeve. The slits 100 are designed to be adapted to the size of the rotor, the position of the rotor relative to the torsion angle to be compensated, loads that the rotor is exposed to, etc. A skilled person will however understand that the slits 100 may also be designed in other ways to achieve the desired function, for example as partly helix form, etc. It should be understood that several slit 100 shapes may be combined to achieve the same.

The rotor 1 in FIG. 1 is for the sake of simplicity shown as a massive element, but constitutes an inner centric sleeve over which centric sleeve there is arranged a number of layers of magnetic conducting sheet metal to which permanent magnets 2 are fastened. The layers of magnetic conducting sheet metal are axially layered along the length for the rotor. A skilled person would know how this is done and is hence not described herein in further details.

Around the circumference of the rotor 1 it is further arranged a number of permanent magnets 2, wherein the permanent magnets 2 extend over the entire or parts of the rotor circumference and/or length. The permanent magnets 2 are suitably connected to the rotor 1, for example by use of glue or similar.

Furthermore, one of the ends of the rotor 1 is designed with a recess U, wherein this recess U forms, together with the end of the rotor 1, the sleeve of the torsion element 3 and the end lid (not shown) a closed volume when the torsion element 3 and rotor 1 are arranged within the house of the electric motor. This closed volume is filled with the same fluid as the filling of the actual motor, for example oil. Within the closed volume it is further arranged a piston 5 attached to the axle (not shown) and a piston 6 attached to the rotor 1. The piston 5 is further designed with at least one through going hole (not shown) that allows a controlled flow across the piston 5 when the pistons 5, 6 are moved relative to each other during torsion of the torsion element 3.

By the use of the electric motor induced magnetic forces are transmitted from stator (not shown) to the permanent magnet 2 and rotor 1 so that a torque is formed around the centre of the rotor 1. Due to the connection of the torsion element 3 to the rotor 1 at point 8 and the axle at point 7 the torque "sweeps" the torsion element 3 from point 8 to point 7. The torque that acts through the torsion element 3 rotates the rotor 1 relative to passing axle. By adjusting the torsion stiffness of the torsion element 3 relative to each rotor, in view of the fact that the closer the rotor is located to the payload, the larger rotation of the rotor relative to the axle, the effect that the number of rotors are rotating equally may be achieved. The different rotation stiffnesses of the torsion elements 3 could however result in that a dynamic torsion resonance (self resonance) between the rotors of the electric motor is achieved. Such dynamic torsion resonances are however dampened and limited by the pistons 5,6 arranged in the recess U since a relative movement of the pistons 5, 6 relative each other will result in that the oil within the recess U could flow through it in the at least one through going hole in the piston 5, whereby a movement dampening is achieved.

Figure 2:
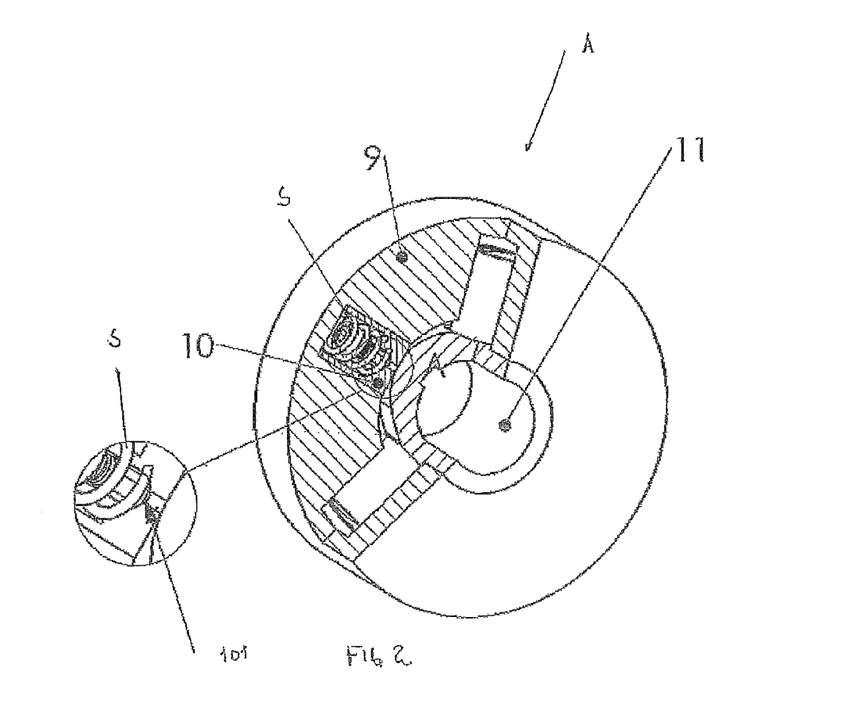
FIG. 2 shows a second embodiment of the device within a system in accordance with the invention.

FIG. 2 shows a second embodiment of a device A for compensation of torsion in an axle extending through the electric motor, wherein the device A is attached and arranged cooperative with each of the rotors 1 of the electric motor (see also FIG. 1), whereby each rotor is then designed with a corresponding device A. For the sake of simplicity the rotor 1 is omitted in FIG. 2, but the rotor 1 can for example be designed as shown in FIG. 1.

In the embodiment shown in FIG. 2 the axle of the electric motor is designed as a cam shaft, wherein the cam shaft 11 extends through the device A for compensation of the torsion in an axle. The device A for compensation of torsion in the cam shaft 11 would then comprise an external house 9, in which external house 9 there are radially arranged a number of hydraulic pistons 10. Each of the hydraulic pistons 10 comprises a spring S and a one-way valve 101. In this way the springs S are pushing the hydraulic pistons 10 towards the cam shaft 11 so that the hydraulic pistons 10 are always in contact with the cam shaft 11. The one-way valves 101 are further designed so that they allow a fluid (for example oil) to flow into each hydraulic pistons 10 when the pistons 10 are moving from their compressed position and towards the cam shaft 11, while the one-way valves 101 prevent inflow of fluid when they are in their compressed position. When the cam shaft 11 is rotating relative to the external house 9 the cam in the cam shaft 11 is pushing/pressing the hydraulic pistons 10 radially outwards, wherein this (based on the added torque) results in that a controlled amount of fluid flows out of each piston. The functional principles are then that the hydraulic pistons 10 having one-way valves 101 are guided by the cams in the cam axle 11 so that they provide an even resistance against torsion from each and one of the rotors of the electric motor. As indicated above each rotor in the electric motor is then connected to the device A for compensation of the torsion in the cam shaft 11, causing all rotors to be self adjusting so that they run synchronized. The common slim axle would then skid with constant angular velocity relative to all rotors. The skid angular velocity relative to the axle is typically as little as possible in view of the practical implementation.

Figure 3:
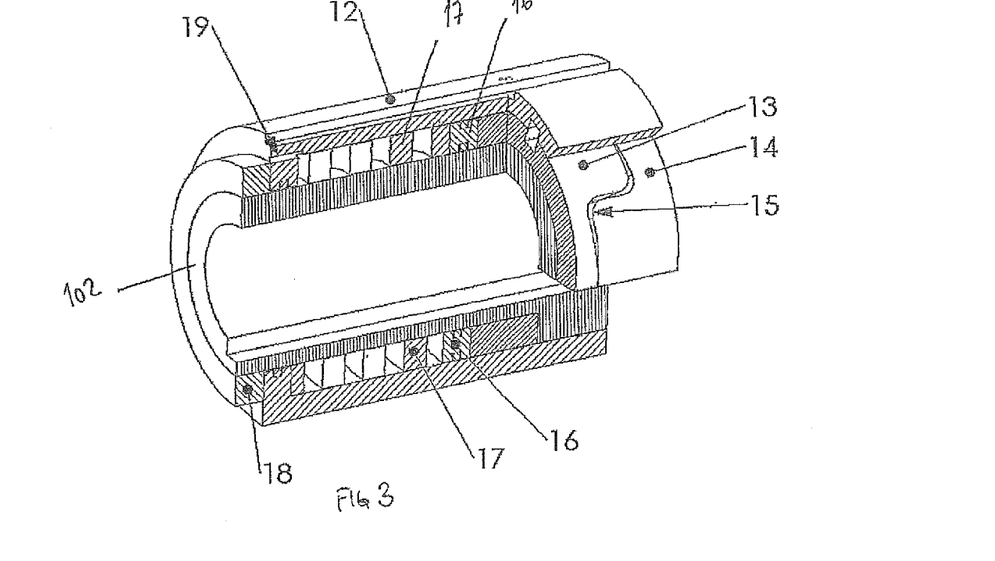
FIG. 3 shows a third embodiment of the device within a system in accordance with the invention.

FIG. 3 shows a third embodiment of a device A for compensation of torsion in an axle extending through the electric motor, wherein the device A is attached and arranged cooperative with each of the rotors 1 of the electric motor (see also FIG. 1), whereby each rotor then is designed with a corresponding device A. The rotor 1 is for the sake of simplicity omitted in FIG. 3, but the rotor 1 could for example have a design as shown in FIG. 1. The rotor 1, which is influenced by magnetic forces between stator and permanent magnets on rotor, would then be attached to an external house 12.

The device A for compensation of torsion in an axle comprises the external house 12 that via a spring device is attached to an inner sleeve 14, wherein the spring device operates with a certain torsion stiffness at relative rotation between the external house 12 and the inner sleeve 14. Further, the inner sleeve 14 is prevented from moving axially by use of a locking sleeve 18. The torsion stiffness between the external house 12 and the inner sleeve 14 is achieved by designing the inner sleeve with a spiral formed surface (threads) 15, which spiral formed surface 15 co-operate with a correspondingly designed spiral shaped surface 15 in an inner sleeve 13. The inner sleeves 13, 14 are then suitably connected to an axle 102, wherein the sleeve 13 is arranged situated inside the sleeve 14. The sleeve 13 is further co-operating with piston 16 arranged between the external house 12 and the axle 102. Piston 16 is balanced by a counter force from a spiral formed spring 17, which spiral formed spring 17 is also arranged between the external house 12 and the axle 102. A space that is limited by the external house 12, the axle 102, the spiral formed spring 17 and the piston 16 is filled with a fluid, for example oil, and this space creates a chamber that together with an opening or slot 19 operates as a viscous damper. The characteristic torsion stiffness is then achieved by combining the gradient of the spiral formed surface 15 that is shaped within the sleeves 13,14 and the axial stiffness of the spiral spring 17. An axial displacement of pistons results in that the specific volume of enclosed oil changes proportionally with axial movement. The oil could then flow in to or out of the chamber through the opening 19. Based on the area of the opening 19 the dynamic response could be adjusted so that self-oscillations in axle 102 and/or between the rotors are avoided or reduced to a minimum.

Figure 4:
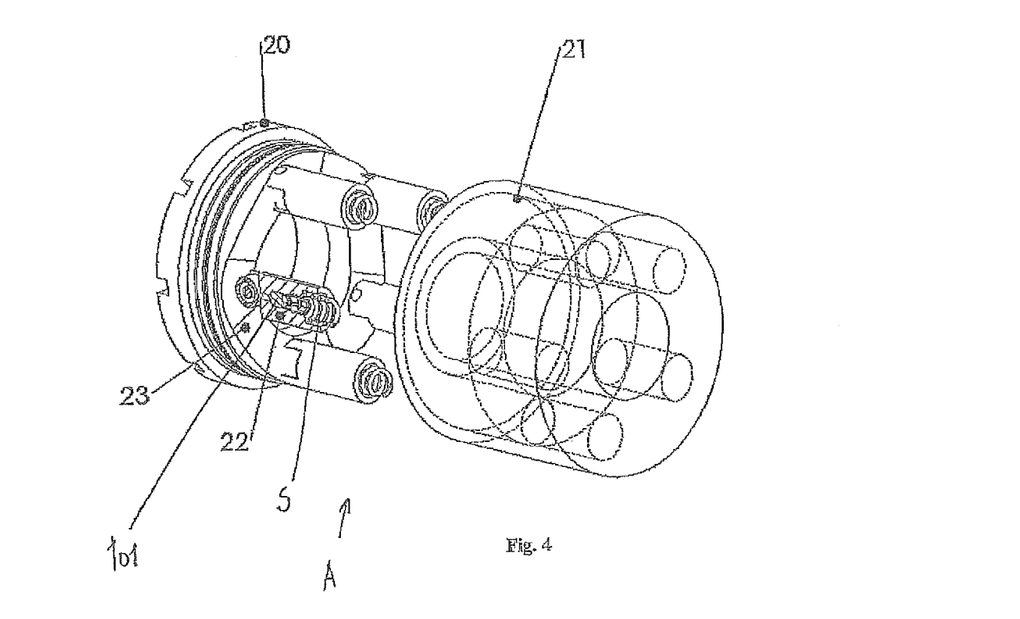
FIG. 4 shows an alternative embodiment of the device within the system in accordance with FIG. 2.

FIG. 4 shows a fourth embodiment of a device A for compensation of torsion in an axle extending through an electric motor, wherein the device A is attached and arranged cooperative with each of the rotors 1 of the electric motor (see also FIG. 1), whereby each rotor then is designed with a corresponding device A. The rotor 1 is for the sake of simplicity omitted in FIG. 4, but the rotor 1 could for example have a design as shown in FIG. 1.

The device A for compensation of torsion in an axle extending through an electric motor comprises an axial cam shaft 23 exerting an approximately proportional angle change in angular velocity with respect to the torque between an outer sleeve 20 and an inner sleeve 21. The axial cam axle 23 is arranged in an axial direction within the outer sleeve 20. Hydraulic pistons 22 are on their side arranged axially extending within the inner sleeve 21. When the outer sleeve 20 is connected to the inner sleeve 21 via the hydraulic pistons, the hydraulic pistons 22 would run over the cams in the axial cam shaft 23 since the inner sleeve 21 is rigidly attached to the axle (not shown) running through the electric motor. The axial cam shaft 23 would then be locked to the magnetic rotor, here represented by the outer sleeve 20. This would result in that the torque generated in the magnetic rotor is transferred to the through-going axle with a relative rotational velocity between the outer sleeve 20 and the inner sleeve 21. The hydraulic pistons 22 also comprise springs S so that the hydraulic pistons 22 are pushed down towards the cam shaft 23. In a similar way as described in connection with the embodiment as shown in FIG. 2, also the hydraulic pistons 22 are here designed with a non-return valve 101, wherein these non return valves 101 only admit oil into the piston chamber of the hydraulic pistons 22. The total resistance against the torque relative to the relative velocity between the outer sleeve 20 and the inner sleeve 21 is then dependent on the attack angle which the hydraulic pistons experiences towards the axial cam shaft 23 and the controlled leakage from each of the hydraulic pistons 22. Also here the skid angular velocity relative to axle is typically as little as possible for practical implementation.

FIG. 5 shows an electric motor having an axle 24, wherein a typical arrangement of rotor elements 26 and support 25 to these rotor elements 26 is arranged on the axle 24, wherein stator elements 27 enclose the rotor elements 26.

The invention claimed is:

1. System for compensation of torsion in an axle within an electric motor, said electric motor comprising a number of individual stator and rotor elements, said number of rotor elements being coupled to permanent magnets, wherein a spring element or liquid flow restriction device for compensation of torsion in said axle is coupled to each of said rotor elements, wherein each device for compensation of torsion in said axle compensates for an angular error due to torsion in said axle between said number of rotor elements, thereby adjusting the relative rotation of each said individual rotor element synchronously to a corresponding stator so that the electrical efficiency is not reduced due to torsion in said axle.

2. System in accordance with claim 1, wherein said device for compensation of torsion comprises a torsion element arranged between each said rotor element and said axle, each said torsion element having a torsion stiffness compensating for torsion in said axle due to torque from each said rotor element, thereby achieving synchronous phase of all rotor elements.

3. System in accordance with claim 2, wherein said system further comprises an enclosed chamber arranged at one end of each said rotor element, said enclosed chamber being limited by said axle, said rotor element and an end lid, said enclosed chamber being filled with a fluid, where a dynamic piston is arranged in said enclosed chamber and attached to said torsion element, and a stationary piston attached to said rotor element, said enclosed chamber, dynamic piston and stationary piston causing dampening of vibrations, thereby reducing or avoiding resonances between said rotor elements or axle.

4. System in accordance with claim 2, wherein the torsion element includes a plurality of slits arranged both circumferentially and along a length of the torsion element.

5. System in accordance with claim 1, wherein said device for compensation of torsion comprises an external house and an inner sleeve, said external house and said inner sleeve arranged between each of said rotor element and said axle, each said external house and said inner sleeve setting up resistance against torque relative a rotation velocity, thereby causing a continuous rotation of each said rotor element relative to each said stator element.

6. System in accordance with claim 5, wherein a device is arranged between said rotor elements and said axle causing dampening of vibrations, thereby reducing or avoiding resonances between said rotor elements or said axle.

7. System in accordance with claim 1, wherein said device for compensation of torsion comprises an outer sleeve and an inner sleeve, said outer sleeve and said inner sleeve arranged between each said rotor element and said axle, each said outer sleeve and said inner sleeve exerting a torque proportional to an angle change in angular velocity between said outer sleeve and said inner sleeve, causing an equal rotation of each said rotor element relative to each said stator element.

8. System in accordance with claim 7, wherein a device is arranged between said rotor elements and said axle causing dampening of vibrations, thereby reducing or avoiding resonances between said rotor elements or said axle.

* * * * *